(12) United States Patent
Davidson et al.

(10) Patent No.: US 6,559,946 B2
(45) Date of Patent: May 6, 2003

(54) METHOD AND APPARATUS TO MINIMIZE EFFECTS OF ASE IN OPTICAL MEASUREMENTS

(75) Inventors: Andrew Davidson, Mountain View, CA (US); Jan-Willem Pieterse, San Jose, CA (US)

(73) Assignee: New Focus, Inc., San Jose, CA (US)

( * ) Notice: Subject to any disclaimer, the term of this patent is extended or adjusted under 35 U.S.C. 154(b) by 31 days.

(21) Appl. No.: 09/978,747

(22) Filed: Oct. 15, 2001

(65) Prior Publication Data
US 2002/0154316 A1 Oct. 24, 2002

Related U.S. Application Data
(60) Provisional application No. 60/253,022, filed on Nov. 22, 2000.

(51) Int. Cl.[7] .................................................. G01B 9/02
(52) U.S. Cl. ....................................... 356/450; 356/477
(58) Field of Search ................................. 356/477, 479, 356/478, 73.1, 450; 250/227.19, 227.27

(56) References Cited

U.S. PATENT DOCUMENTS 4,806,760 A * 2/1989 McGlade .................... 250/330
5,365,335 A * 11/1994 Sorin .......................... 356/479

* cited by examiner

Primary Examiner—Samuel A. Turner
Assistant Examiner—Michael A. Lyons
(74) Attorney, Agent, or Firm—Morrison & Foerster LLP (57) ABSTRACT

A method and apparatus for minimizing the effects of noise when measuring a response of a device under test to laser light. Laser light provided from a laser source is provided to an interferometer, which splits the source laser light into a first laser light portion and a second laser light portion and then interferometrically combines the first laser light and the second laser light, resulting in a time-varying interference modulated test laser light and a time-varying interference modulated reference laser light. The time-varying interference modulated test laser light is propagated to a device under test so as to cause the device under test to propagate responsive time-varying interference modulated test laser light. The responsive time-varying interference modulated test laser light is converted to an responsive amplitude modulated electrical test signal, which is high pass filtered. The high pass filtered signal is then demodulated so as to produce a time-varying electrical signal that represents the responsive time-varying interference modulated test laser light propagated by the device under test in response to the time varying interference modulated test laser light.

32 Claims, 10 Drawing Sheets

METHOD AND APPARATUS TO MINIMIZE EFFECTS OF ASE IN OPTICAL MEASUREMENTS

RELATED APPLICATIONS

This application claims the benefit of U.S. Provisional Application No. 60/253,022, entitled "A Means To Eliminate Effects Of ASE in Optical Measurements" filed Nov. 22, 2000, which is incorporated by reference herein in its entirety.

TECHNICAL FIELD

The present invention relates to the general field of optical devices. More specifically the invention relates to making optical measurements with reduced effects of amplified spontaneous emission.

BACKGROUND

There are a variety of test systems that attempt to accurately characterize the transmission and reflection properties of optical devices. Such optical devices include fiber-based filters, multiplexers, and other such optical devices. In order to meet the demands of today's wavelength division multiplexed systems, it is important to make these measurements with high accuracy.

Figure 6:
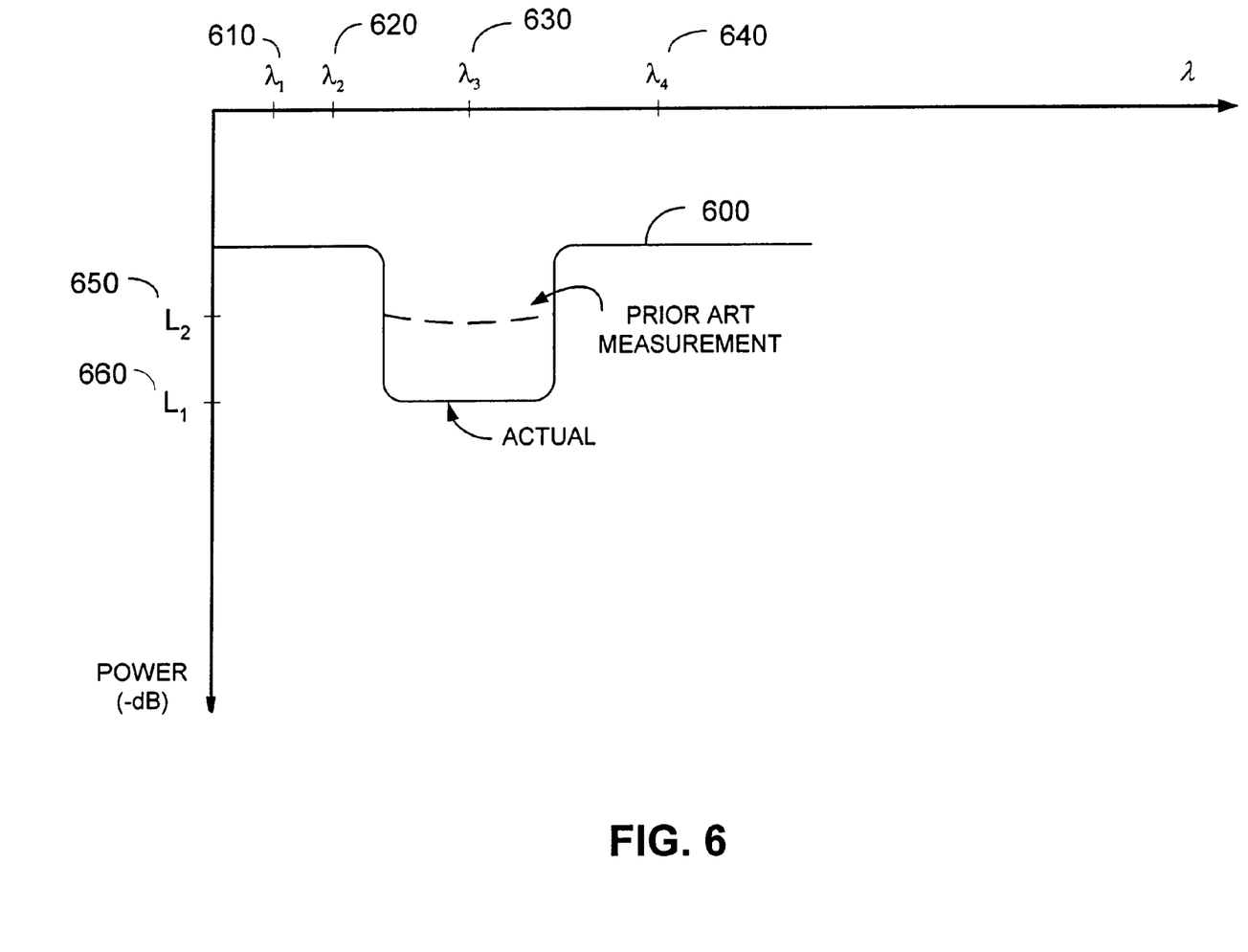
FIG. 6 illustrates a prior art measurement of the insertion loss of a notch filter.

When using a laser to measure transmission through or reflection from a device, it is desired to measure the transmitted or reflected power only at a single wavelength, often referred to as the lasing wavelength. This laser power typically is measured using a photodetector. The ideal laser would only emit light at a single wavelength at any given instant. However, the presence of a broadband background of light at other wavelengths emitted by practical lasers, known as amplified spontaneous emission (ASE), in the light output beam from a laser at a given lasing wavelength adversely effects the ability to characterize the wavelength dependence of optical devices, degrading the accuracy of the measurement. More particularly, the amplified spontaneous emission limits the ability of a photodetector to specifically detect the lasing wavelength when making measurements since other wavelengths are detected by photodetectors. For example, measuring the high loss of filters with high contrast between stopbands and passbands can be difficult since the unattenuated ASE power transmitted through the passbands can be larger than the power of the lasing wavelength transmitted through the stopband. Referring to FIG. 6, a known wavelength transmission characteristic 600 for a notch filter is set forth. The filter is in the passband region at lasing wavelength 610, lasing wavelength 620, and lasing wavelength 640. At lasing wavelength 630, the filter is in the stopband region. The filter has a known loss of L1 660 in the stopband. However, due to the effects of ASE in making optical measurements in the prior art, the loss at lasing wavelength 630 is measured to be only L2 650.

In the past, several approaches have been used to reduce the effects of ASE. One approach is to design a better laser cavity which produces a laser output with lower amplified spontaneous emission. This approach is difficult, more expensive, and results in a lowered optical power output.

Another approach in the past is to use a tunable bandpass filter which passes only the lasing wavelength and blocks the unwanted ASE wavelengths from the detector. In order for such a filter to be effective, the filter should be capable of successfully tracking the lasing wavelength, and should have the desired filter shape to eliminate a substantial amount of the amplified spontaneous emission. Problems with this approach in the past include the expense and difficulty of both building the filter and controlling the filter. In addition, performance of the filter may be limited, as the filter may not adequately block the amplified spontaneous emissions, and use of the filter may cause a power ripple in the system.

As a result of the limitations in the prior art, there has been a need for a different, less expensive, and higher performance means to measure the power of a single wavelength of light in the presence of amplified spontaneous emission. The present invention meets this need.

SUMMARY OF THE INVENTION

The present invention provides a solution to the needs described above through an apparatus and method to minimize the effects of amplified spontaneous emission in optical measurements.

An embodiment of the invention presents an apparatus and method for minimizing the effects of noise when measuring a response of a device under test to laser light. Time-varying interference modulations are imparted to a laser light to produce a time-varying interference modulated test laser light and a time-varying interference modulated reference laser light. The time-varying interference modulated test laser light is propagated to the device under test, causing the device under test to propagate responsive time-varying interference modulated test laser light. The responsive time-varying interference modulated test laser light is converted to a responsive amplitude modulated electrical test signal and high pass filtered. The high pass filtered amplitude modulated electrical test signal is then processed to produce a time-varying electrical signal that represents the responsive time-varying interference modulated test laser light propagated by the device under test in response to the time varying interference modulated test laser light.

An embodiment of the invention presents an apparatus and method for minimizing the effects of noise when measuring a response of a device under test to laser light. Laser light provided from a laser source is scanned through a range of lasing light wavelengths so as to produce source laser light with a time-varying lasing light wavelength. This time-varying lasing light wavelength is provided to an interferometer with a first arm with a first optical path length and a second arm with a second optical path length. There is a path length difference between the first optical path length and the second optical path length. The source laser light is split into a first laser light portion and a second laser light portion. The first laser light portion travels down the first arm and the second laser light portion travel down the second arm and there is a difference in propagation time between the first laser light portion and the second laser light portion due to the path length difference. The first laser light portion and the second laser light portion are interferometrically combined, resulting in a time-varying interference modulated test laser light and a time-varying interference modulated reference laser light. The time-varying interference modulated test laser light is propagated to a device under test so as to cause the device under test to propagate responsive time-varying interference modulated test laser light. The responsive time-varying interference modulated test laser light is converted to an responsive amplitude modulated electrical test signal, which is high pass filtered. The high pass filtered signal is then processed so as to produce a time-varying electrical signal that represents the responsive time-varying interference modulated test laser light propagated by the device under test in response to the time varying interference modulated test laser light.

An embodiment of the invention presents another apparatus and method for minimizing the effects of noise when measuring a response of a device under test to laser light. Laser light at a prescribed wavelength is provided from a laser source. A time varying interferometer splits the laser light into a first laser light portion and a second laser light portion. The first laser light portion and second laser light portion travel different optical paths and the path length difference is time varying. The first laser light portion and the second laser light portion are interferometrically combined, producing a time-varying interference modulated test laser light and a time-varying interference modulated reference laser light. The time-varying interference modulated test laser light is propagated to a device under test so as to cause the device under test to propagate responsive time-varying interference modulated test laser light. The responsive time-varying interference modulated test laser light is converted to an responsive amplitude modulated electrical test signal, which is high pass filtered. The high pass filtered signal is then processed so as to produce a time-varying electrical signal that represents the responsive time-varying interference modulated test laser light propagated by the device under test in response to the time varying interference modulated test laser light.

An embodiment of the invention presents another apparatus and method for minimizing the effects of noise when measuring a response of a device under test to laser light. Laser light at a lasing wavelength is provided from a laser source. The phase or wavelength of the lasing light is modulated. This time-varying lasing light is provided to an interferometer with a first arm with a first optical path length and a second arm with a second optical path length. There is a path length difference between the first optical path length and the second optical path length. The source laser light is split into a first laser light portion and a second laser light portion. The first laser light portion travels down the first arm and the second laser light portion travels down the second arm and there is a difference in propagation time between the first laser light portion and the second laser light portion due to the path length difference. The first laser light portion and the second laser light portion are interferometrically combined, producing a time-varying interference modulated test laser light and a time-varying interference modulated reference laser light. The time-varying interference modulated test laser light is propagated to a device under test so as to cause the device under test to propagate responsive time-varying interference modulated test laser light. The responsive time-varying interference modulated test laser light is converted to an responsive amplitude modulated electrical test signal, which is high pass filtered. The high pass filtered signal is then processed so as to produce a time-varying electrical signal that represents the responsive time-varying interference modulated test laser light propagated by the device under test in response to the time varying interference modulated test laser light.

In an embodiment of the invention, a method for removing the effects of amplified spontaneous emission upon the response of a device under test to a lasing light is presented. The method comprises providing a high frequency time-varying lasing light, and propagating the high frequency time varying lasing light to a device under test, which results in a responsive high frequency time-varying lasing light at the output of the device under test. This responsive signal is converted to a high frequency electrical signal, and then high pass filtered to reduce the effects of amplified spontaneous emission.

DESCRIPTION OF THE DRAWINGS

The features and advantages of the system and method of the present invention will be apparent from the following description in which.

DESCRIPTION OF THE PREFERRED EMBODIMENTS

The present invention provides a solution to the needs described above through an apparatus and method for minimizing the effects of amplified spontaneous emission when characterizing optical devices.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

The apparatus and method utilizes interferometric techniques and detection techniques to minimize the effects of amplified spontaneous emission on optical measurements. The interferometric techniques can be used when characterizing the wavelength dependence of optical devices. In a present embodiment, the apparatus and method use an interferometric device to impart an amplitude modulation on one or more lasing wavelength proportional to the power at the lasing wavelength but not the amplified spontaneous emission. The power at the lasing wavelength is determined from the modulation amplitude of the amplitude modulated light. The modulation amplitude is determined by electronics or software after optical to electrical conversion. This method of detection is new and produces a much improved dynamic measurement range. Utilizing the method of the present invention, the effects of amplified spontaneous emission in a lasing source upon the measurement of the characteristics of a DUT can be minimized.

Figure 1:
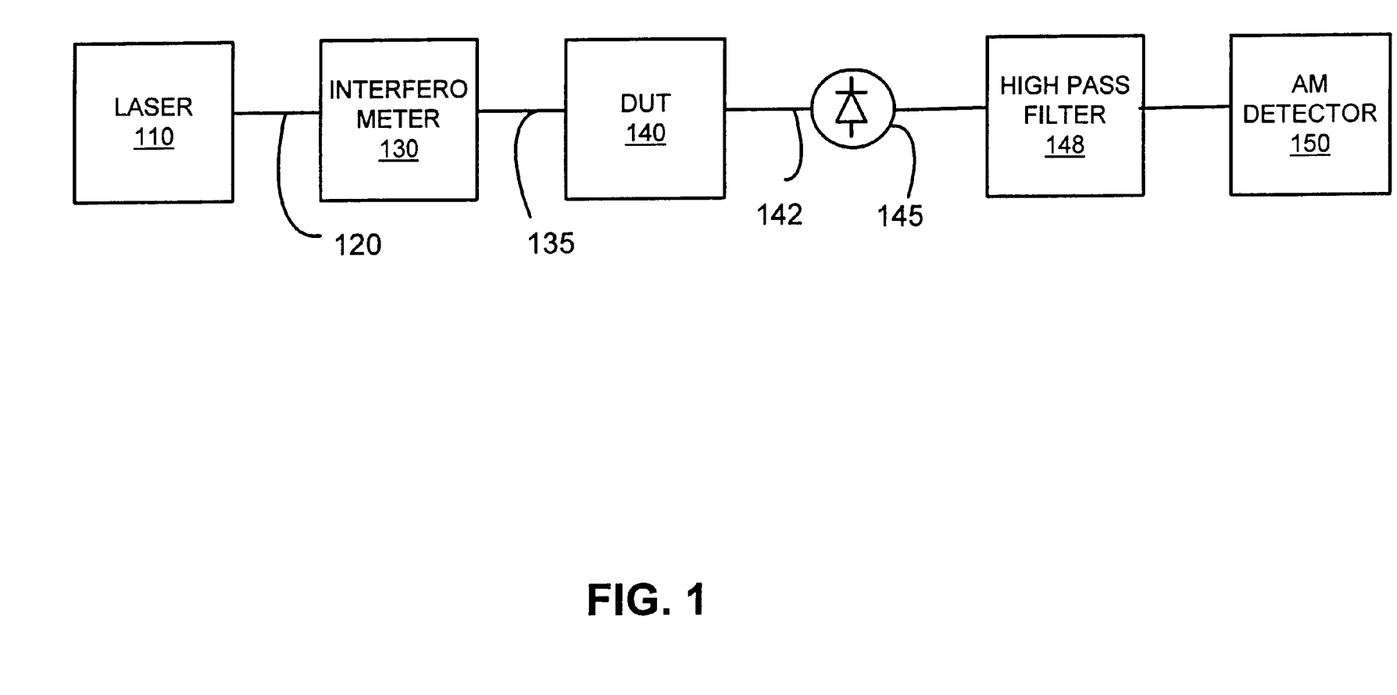
FIG. 1 illustrates a block diagram of a basic configuration utilizing the present invention.

Referring to FIG. 1, a block diagram of a basic configuration utilizing an embodiment of the present invention to characterize a device under test is shown. The basic configuration comprises a laser 110, interferometric device 130, device under test 140, photodetector 145 high pass filter 148, and amplitude modulation detector 150. Although not shown, between laser 110 and interferometric device 130 may be one or more optical amplifiers that introduce additional amplified spontaneous emission or optical noise into the laser output. This additional amplified spontaneous emission is also minimized utilizing the interferometric techniques of the present invention in characterizing a device under test 140. Such one or more optical amplifiers may be advantageously used to provide sufficient power to a light beam that is split in order to characterize multiple devices under test with only one laser light source. Although shown separately, the function of high pass filter 148 may be performed by AM detector 150.

Laser 110 produces an output beam 120 at one or more lasing wavelengths. The laser output may be a fixed wavelength or scanned through a range of wavelengths depending on the particular embodiment of the invention, discussed in further detail below. Output beam 120 generally includes broadband amplified spontaneous emission which can adversely effect accurate characterization of the device under test 140. In order to minimize the effects of the amplified spontaneous emission, output beam 120 is provided to an interferometric device 130 which imparts a time-varying interference modulation. In a present embodiment, the interferometric device 130 outputs an amplitude modulated signal 135 proportional to the power of the laser output at the lasing wavelength. The interferometric device 130 may be time-varying depending on the particular embodiment of the invention. In a present embodiment, the amplified spontaneous emission component appears as an unmodulated component of the amplitude modulated signal at the output of the interferometric device 130. Interferometric device 130 may be a Michelson, Mach Zehnder, an etalon, or other type of interferometer. The amplitude modulated light signal 135 is provided to device under test 140 which outputs a responsive signal that is provided to a photodetector 145. Photodetector 145 senses the amplitude modulated light signal 135 output from the device under test 140 and converts it to an electrical signal. AM detector 150 detects and processes, utilizing either in electronics or software, the amplitude of the amplitude modulated electrical signal received from the output of the photodetector 145. AM Detector 150 detects only the modulation amplitude of the amplitude modulated electrical signal, and not the slowly varying component which includes the contribution from the unmodulated optical component, thereby minimizing the effects of amplified spontaneous emission on characterizing the device under test 140.

Figure 2:
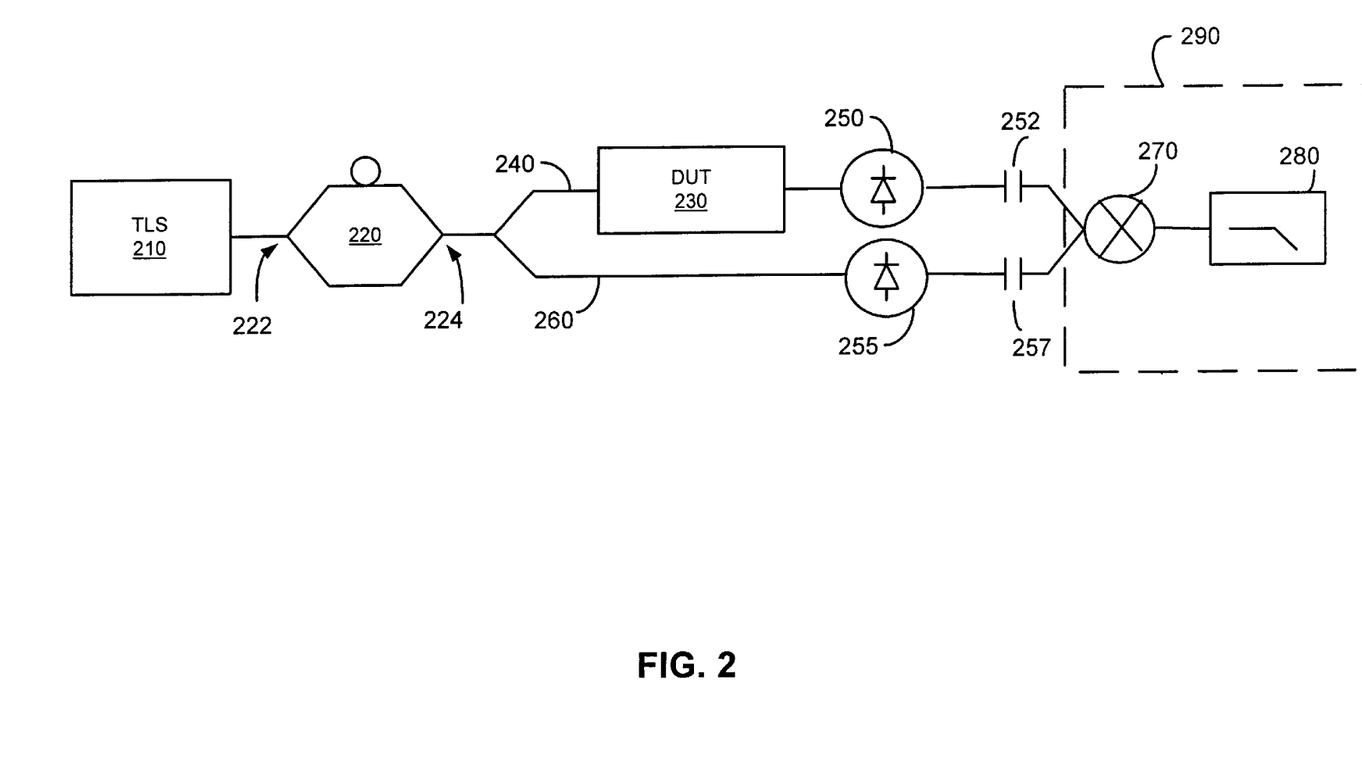
FIG. 2 illustrates a presently preferred embodiment of an apparatus utilizing the invention to test an optical device.

Referring to FIG. 2, a presently preferred embodiment of an apparatus utilizing the invention to measure the response of a device under test 230 is shown. A tunable external cavity diode laser 210 is coupled to a Mach-Zehnder interferometer 220. The device under test 230 is coupled to one output of the Mach-Zehnder interferometer 220, and a photodetector 250 is coupled to the output of the device under test 230. A photodetector 255 is coupled to the second output of the Mach Zehnder interferometer 220, and a high pass filter capacitor 257 is coupled to the output of photodetector 255. A high pass filter capacitor 252 is coupled to the output of photodetector 250. The filtered output of 252 and the filtered output of 257 are provided to mixer 270. The output of mixer 270 is provided to LPF 280.

Tunable external cavity diode laser 210 capable of producing light at different wavelengths is utilized to characterize the device under test 230. In the presently preferred embodiment, the source laser light output from laser 210 and provided to the Mach-Zehnder interferometer is scanned through a range of lasing wavelengths, producing an output varying in lasing wavelength with time. Utilizing a tunable laser to sweep the wavelength applied to optical devices provides a fast and accurate way to characterize the wavelength dependence transmission and reflection properties of the device under test.

Figure 3:
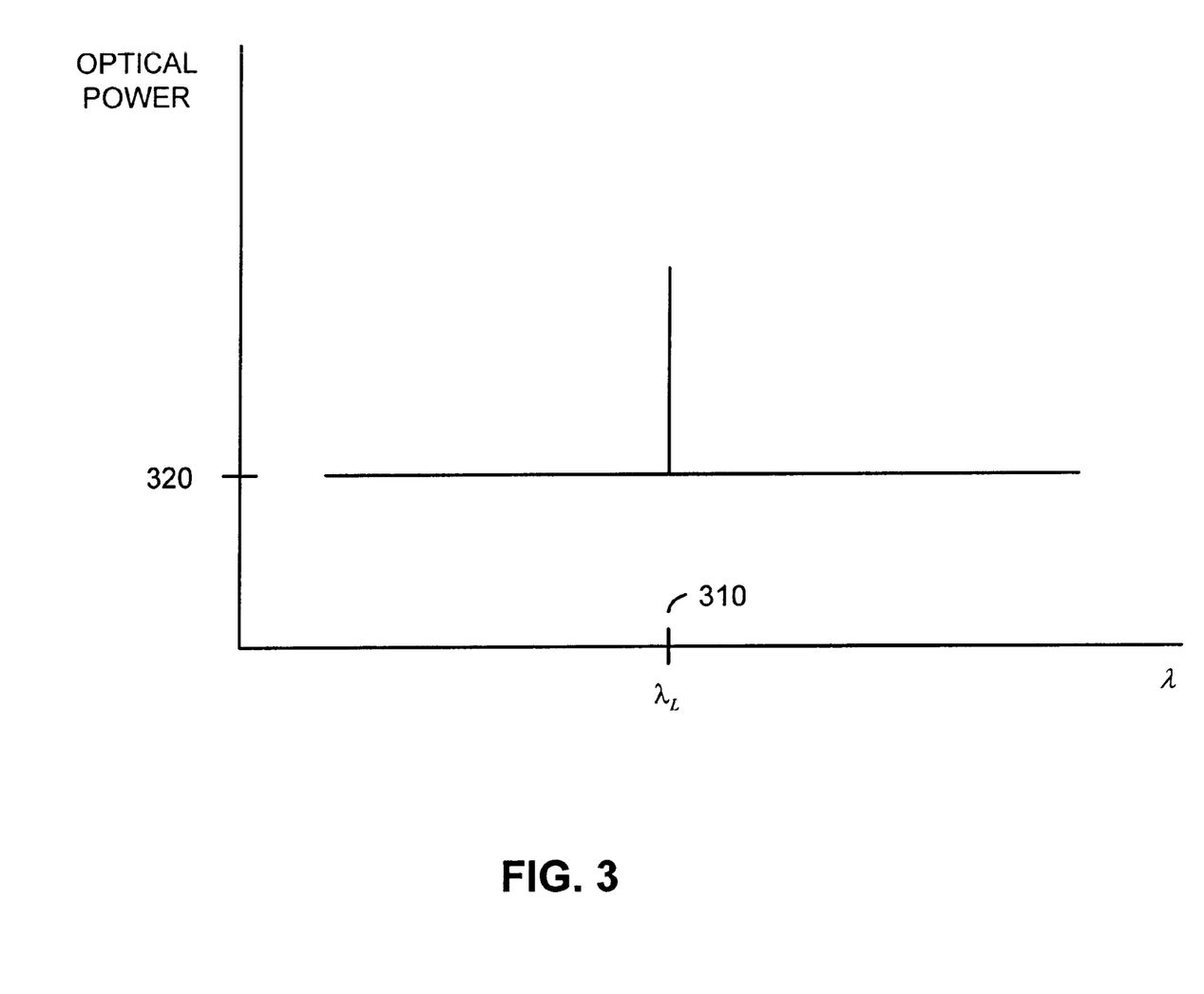
FIG. 3 illustrates the optical power of the output of tunable laser at lasing wavelength as a function of wavelength.

Tunable laser 210 generates light amplification by the stimulated emission of radiation, and also emits photons which are the result of spontaneous emissions. Spontaneous emissions are the result of atoms or molecules absorbing energy and then quickly releasing it by themselves. The emitted photons resulting from spontaneous emissions are emitted in random directions, polarizations, and phase. This is in contrast to the stimulated emission process where the emitted photons have the same direction of propagation, phase, and polarization as the incident photons stimulating the emission. The stimulated emission process is described to be coherent, whereas the spontaneous emission process is said to be incoherent. Spontaneous emissions then become amplified during the amplification process of the tunable external cavity diode laser 210, producing amplified spontaneous emission. The presence of amplified spontaneous emission power at all wavelengths within the bandwidth of the laser has deleterious effects on the ability to accurately characterize the power transmission and reflection properties of an optical device at a given lasing wavelength. Referring to FIG. 3, the optical power of the output of tunable laser 210 at lasing wavelength 310 is shown as a function of wavelength. Amplified spontaneous emission in the laser output results in a broadband power contribution 320 across the wavelength spectrum.

The electric field of a linearly swept laser at the input to the Mach Zehnder interferometer can be written as $$E(t) = \left[E_0 e^{-i(\omega_0 + \frac{1}{2}2\pi R \cdot t)t} + E_{x\_ASE}(t)\right]\hat{x} + E_{y\_ASE}(t)\hat{y}$$

where $E_0$ is the amplitude of the lasing electric field, $\omega_0$ is the instantaneous angular frequency of the lasing field at t=0, and $E_{x\_ASE}$ and $E_{y\_ASE}$ are the ASE amplitudes of polarization components parallel to, and perpendicular to, the lasing field polarization. R is the rate at which the lasing frequency sweeps in units of Hz/s.

In an embodiment of the invention, Mach-Zehnder interferometer 220 has different arm lengths and is constructed by connecting two fiber couplers, 222 and 224 in series. The time varying, linearly swept laser light beam provided to the M-Z interferometer is split into two waves by the first coupler 222 that travel different optical path lengths to coupler 224. The two waves acquire different phase shifts since the arm lengths are of different optical path lengths. The two signals then interfere at the second coupler, which recombines the two waves to produce outputs that are functions of the difference in optical path lengths. As the wavelength (or frequency) of tunable laser 210 is swept as a function of time, the delay between the two signals in the arms of the interferometer produces an intensity modulated signal when the two signals recombine. Specifically, the delay between the arms is proportional to the difference in path length (delta L) divided by the propagation velocity. As tunable laser 210 sweeps the output frequency as a function of time, the delay causes a difference in frequency ($\Delta \cdot R$) of the two recombined beams equal to the difference in propagation time of the two arms ($\Delta$) multiplied by the frequency sweep rate, R. Combining the beams creates an intensity modulation at the difference frequency, $\Delta \cdot R$. This intensity modulation is also known as a beat note. The period of modulation of this signal is $1/(\Delta \cdot R)$ Sweeping the wavelength of tunable laser 210 produces a characterization of the entire wavelength dependence of the transmission and reflective properties of the device under test.

In order for the two signals to interfere at the second coupler to produce an amplitude modulated signal of relative spectral purity, the optical path length difference must be significantly less the than coherence length of the laser. If the path length difference is greater than the coherence length, then noise in the modulated signal could potentially degrade the measurement. The coherence length of a laser is generally in the order of a kilometer for an external cavity diode laser and in the order of tens of meters for other diode lasers.

At the first coupler of the Mach-Zehnder interferometer, the amplified spontaneous emission component of the linearly swept laser light beam is also split into two waves. In contrast to the signal at the lasing wavelength, the coherence length of the amplified spontaneous emission component is very short and in the order of approximately 100 micrometers. In order to minimize the effects of the amplified spontaneous emission in characterizing the transmission and reflection properties of optical devices, the difference in path length between the two arms of the Mach-Zehnder interferometer must be greater than the coherence length of the amplified spontaneous emission. If the difference in path length is greater than the coherence length of the amplified spontaneous emission, the amplified spontaneous emission components of the input signal in each arm will not be amplitude modulated like the signal at the lasing wavelength, and will appear to the detector as an unmodulated signal component when interference occurs incoherently at the second coupler. The amplified spontaneous emission is thus split evenly between the two Mach-Zehnder outputs and the amplitude of the modulated signal is then proportional to the power in the laser wavelength only.

Other types of interferometers may also be utilized in the present invention. Michelson interferometers operate in a similar manner to Mach Zehnder interferometers. A Michelson interferometer may be made by connecting two pieces of fiber to the output ports of a fiber coupler and attaching completely reflecting mirrors or at the other end of the fibers. Similar to the Mach Zehnder interferometer, the Michelson interferometer splits an input optical field into two parts at the fiber coupler, with each part acquiring a phase shift and the two parts recombining interferometrically at the coupler.

The output field of the Mach Zehnder interferometer 220 can then be written as $$E(t) = \frac{1}{2}\left[E_0 e^{-i(\omega_0 + \frac{1}{2}2\pi R t)t} + E_0 e^{-i(\omega_0 + \frac{1}{2}2\pi R(t-\Delta))(t-\Delta)} + E_{x\_ASE}(t) + E_{x\_ASE}(t-\Delta)\right]\hat{x} + \frac{1}{2}[E_{y\_ASE}(t) + E_{y\_ASE}(t-\Delta)]\hat{y}$$

where $\Delta$ is the time delay due to the path length difference. This can be re-written, ignoring phase constants, as $$E(t) = \left[E_0 \cos\left(\frac{\Delta \cdot 2\pi R \cdot t}{2}\right) \cdot e^{-i(\omega_0 - \frac{\Delta \cdot 2\pi R}{2} + \frac{1}{2} \cdot 2\pi R \cdot t)t} + \frac{1}{2}(E_{x\_ASE}(t) + E_{x\_ASE}(t-\Delta))\right]\hat{x} + \frac{1}{2}[E_{y\_ASE}(t) + E_{y\_ASE}(t-\Delta)]\hat{y}$$

to show the cosine modulation of the electric field. The ASE terms in the above expression are assumed to have a coherence length much shorter than the delay $\Delta$, therefore they add incoherently both with themselves and with the lasing field and so produce negligible modulation at frequencies of interest, namely, frequencies within the bandwidth of the detection system. $\Delta$ and R are chosen so that their product, the resulting modulation frequency of the intensity modulated output of the Mach Zehnder interferometer, is within the detection bandwidth of the AM detector. In addition, as discussed in greater detail below, the resulting modulation frequency should be sufficiently high to provide adequate resolution of the device under test being characterized. The detected photocurrent will be $$I_{pd}(t) \propto \frac{E_0^2}{2}(1 + \cos(\Delta \cdot 2\pi R \cdot t)) + \frac{1}{2}P_{x\_ASE} + \frac{1}{2}P_{y\_ASE}$$

where $P_{x\_ASE}$ is the noise power in the $\hat{x}$ polarization. This is an amplitude modulated photo current with modulation frequency $\Delta \cdot R$ and modulation amplitude proportional to the power in the lasing field. The ASE photocurrent will have a slight amplitude fluctuation within the detection bandwidth, but practically speaking it contributes only an unmodulated component.

The amplitude modulated signal 240 output by one arm of the Mach Zehnder interferometer is input to the device under test 230 to generate a responsive signal at the output of the device under test 230. The modulation amplitude of the responsive transmitted or reflected signal is used to determine transmitted or reflected powers. In the preferred embodiment, the laser output is input to the Mach Zehnder interferometer prior to input to the device under test 230. In alternative embodiments, the laser output may first be input to the device under test 230 prior to being input to the Mach Zehnder interferometer. In the preferred embodiment, the amplitude modulated signal output by the second arm of the Mach Zehnder interferometer is used as a reference signal by the AM detector 290, discussed in further detail below.

The path length difference of the Mach-Zehnder interferometer can be adjusted to optimize wavelength resolution so that filters with sharp edges can be accurately measured. Two competing factors limit wavelength resolution—the modulation frequency and the optical spectrum width. With regard to modulation frequency, it is desired that several modulation cycles fall within the rising or falling edge of a filter. Hence, the delay between the arms must be sufficiently large. In a general sense, the period of modulation $1/(\Delta \cdot R)$ multiplied by the frequency sweep rate R represents a resolution limit $1/\Delta$ and should be much less than the spectral width of a filter feature being measured. For example, a filter with a 10 GHz edge would require $1/\Delta<<10$ GHz. The second resolution limit, optical spectrum, is given by the spectrum of the test signal with components separated by $\Delta \cdot R$, and one would want $\Delta \cdot R<<10$ GHz. Requiring that the two limits be equal ($1/\Delta=\Delta \cdot R$) yields an optimum relation between $\Delta$ and R when considering resolution: $\Delta=\sqrt{1/R}$.

This optimum relation yields a resolution limit of √R and also a modulation frequency of √R. Other factors such as laser linewidth or tuning linearity could dictate operation with a delay shorter than this optimum.

The present invention enables measurement of the insertion loss of the filter DUT at each wavelength while minimizing the effects of amplified spontaneous emission. The Mach-Zehnder interferometer utilizes polarization maintaining components so that the signals in the two arms maintain the same polarization state so that the intensity modulation depth is maximized when recombined at the second coupler. PM fiber and couplers are used in the Mach-Zehnder interferometer to maintain polarization of the two signals. Alternatively, polarization control can be used to assure the polarizations of the two signals are aligned when they are recombined.

Figure 5:
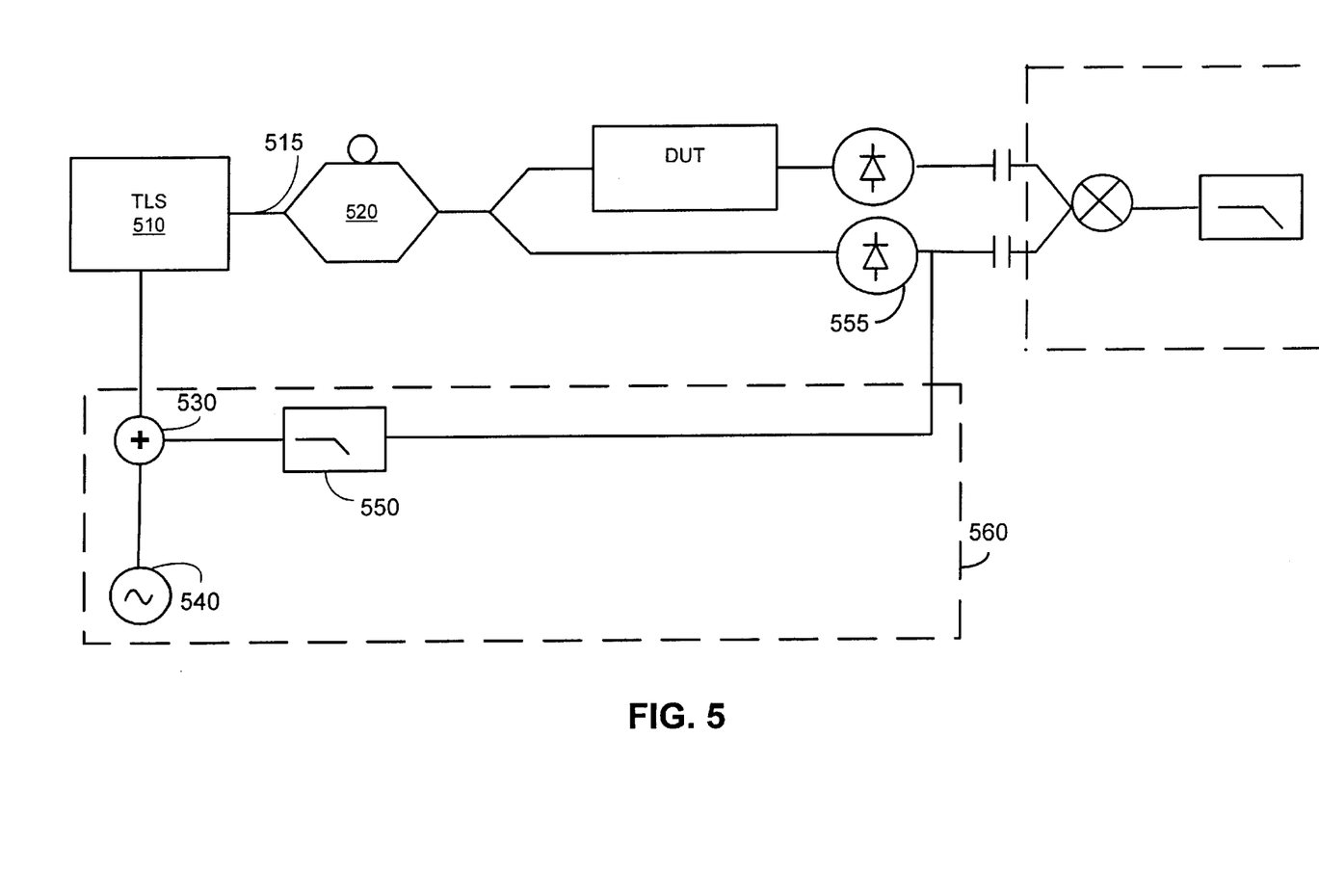
FIG. 5 illustrates feedback loop utilized in modulating a fixed wavelength laser output with a dithering frequency.

In an alternative embodiment, rather than sweeping the lasing wavelength output by tunable laser 210, the lasing wavelength from the laser is held nominally constant and the phase or wavelength is modulated. Referring to FIG. 5, the phase or wavelength of tunable laser 510 is dithered about a desired wavelength, which in turn produces the modulation at the output of the Mach-Zehnder interferometer Measurement of the modulation amplitude suppresses the effects of amplified spontaneous emission. The effect of the modulation will be constructive interference creating peaks at times and destructive interference at other times at the interferometer output. The amplified spontaneous emission is incoherent and creates an unmodulated component of the detected signal. Amplitude modulation is produced utilizing the changing phase combined with the path length difference via a similar mechanism as described above for sweeping the wavelength output from the laser.

Referring to FIG. 5, a low frequency feedback loop 560 locks the lasing wavelength to the Mach-Zehnder interferometer. Feedback loop 560 comprises a low pass filter 550 and an adder 530 to add the signal to the oscillator 540 signal. Alternatively, low pass filter 550 can be an integrator. Summing function 530 adds a high frequency dither at frequency $f_{dither}$ from the output of oscillator 540 to the signal output from photodetector 555 filtered using low pass filter 550. The output of adder 530 is input as a control signal to tunable laser 510 to produce a dithered wavelength, or phase modulated, output 515. Oscillator 540 avoids the need for a phase modulator to produce an amplitude modulated signal at a single measurement wavelength.

Alternative embodiments for utilizing a varying lasing wavelength during the measurement time combined with the path length difference of the arms in the Mach-Zehnder interferometer to produce a modulated signal include utilizing natural wavelength fluctuations and utilizing the linewidth of the laser itself.

Figure 4A:
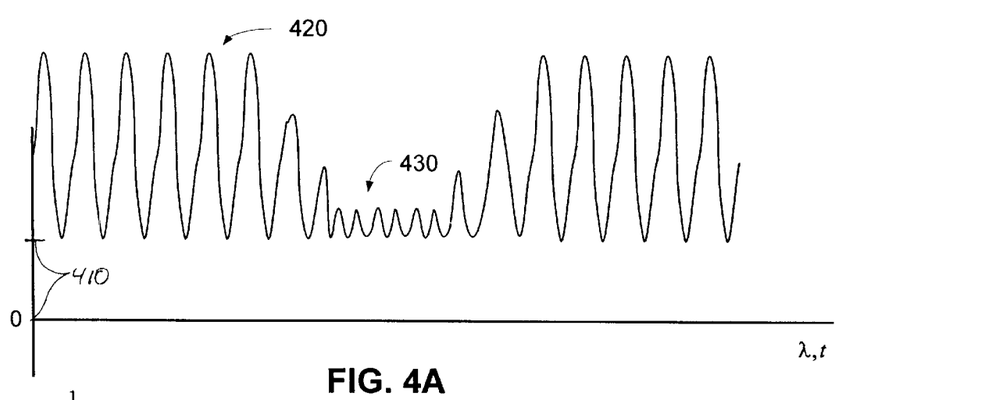
FIG. 4a illustrates the electrical signal output by photodetector characterizing the wavelength dependent transmission properties of a filter device under test.

The responsive light signal output from the device under test 230 is input to a photodetector 250. Photodetector 250 senses the light signal from the device under test and converts it to an electrical signal. Referring to FIG. 4a, the electrical signal output by photodetector 250 characterizing the wavelength dependent transmission properties of a filter device under test 230 is shown. The electrical signal output contains an unmodulated component offset 410 resulting from amplified spontaneous emissions in the output of the tunable laser 210. The detected waveform amplitude in the bandpass wavelength region 420 is high, and the detected waveform amplitude in the stopband wavelength region 430 is low. Amplitude modulation of the light output from the laser results in detection of a higher frequency signal by the photodetector 250, thereby decreasing effects of 1/f noise potentially present in the detection system. Photodetector 250 is a photodiode that outputs an electrical current with amplitude proportional to the amplitude of the input light power. Photodetector 250 detects and outputs a slowly varying current component resulting from amplified spontaneous emission in the laser output beam.

After conversion to an electrical signal by photodetector 250, the slowly varying component of the amplitude modulated signal resulting from ASE in the laser 210 is filtered out with a high pass filter capacitor 252. The value of high pass filter capacitor 252 is a function of the wavelength sweep speed and modulation frequency.

Figure 4B:
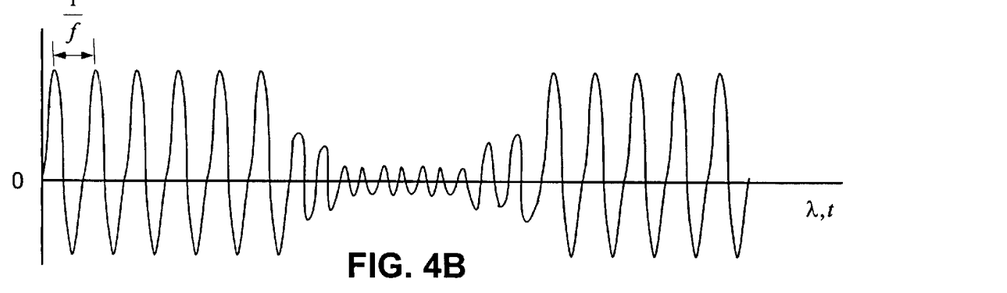
FIG. 4b illustrates the electrical signal of FIG. 4a high-pass filtering.

Thus, the present invention enables an accurate measurement of the optical properties of a device under test regardless of the initial quantity of the amplified spontaneous emission in the tunable laser or amplified spontaneous emission introduced resulting from any subsequent optical amplifier. The accurate measurement can be obtained since the effects of amplified spontaneous emissions are minimized by converting the responsive optical signal output by the device under test to an electrical signal, which enables filtering out of the adverse effects of amplified spontaneous emission since the amplified spontaneous emission appears as an unwanted slowly varying voltage that can be filtered out through high pass filtering. Referring to FIG. 4b, the detected electrical signal after high pass filtering is shown.

This electrical signal can then be processed so as to observe the response of the device under test. Processing of the high pass filtered signal should result in a waveform representative of the response of the device under test to the lasing light. In one embodiment, processing involves conventional am detection.

In a current embodiment, an AM detector 290 receives the electrical signal to detect the modulation amplitude to determine the optical transmission and reflection properties of the device under test 230. In alternative embodiments, the slowly varying component of the amplitude modulated signal resulting from amplified spontaneous emission may be filtered out by AM detector 290 instead of high pass filter capacitor 252. Numerous methods known to those of ordinary skill in the art are possible to process the electrical signal to detect the modulation amplitude once it has been converted to an electrical signal. These methods include both power and voltage detection. AM detector 290 may be of conventional construction, and thus may include amplifiers, detectors, a local oscillator, digital signal processing circuitry, and other circuitry that is commonly included in amplitude modulation radio receivers.

Figure 4C:
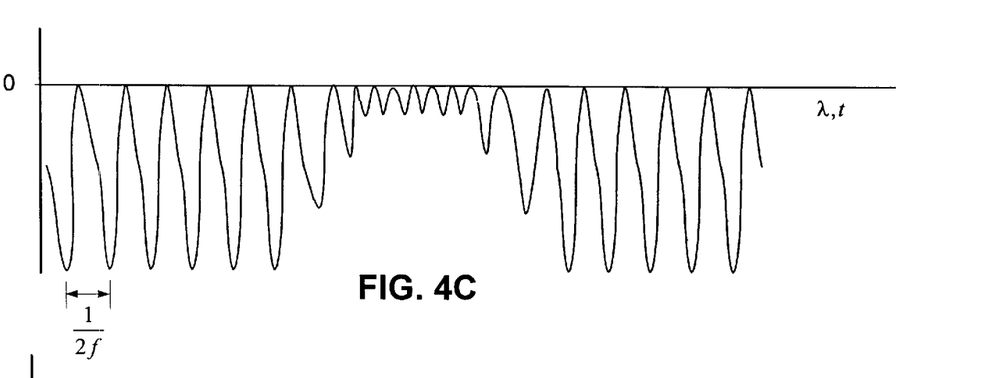
FIG. 4c illustrates the electrical signal of FIG. 4c after multiplication by a reference signal showing twice the modulated frequency.
Figure 4D:
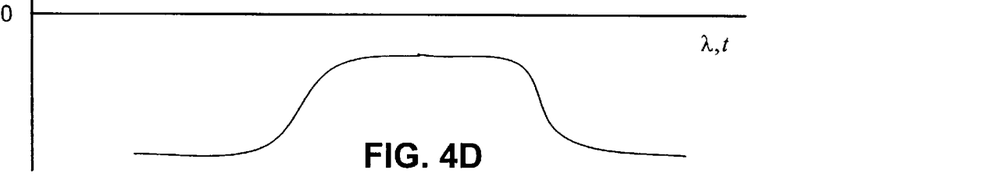
FIG. 4d illustrates the electrical signal of FIG. 4c after low pass filtering.

In a first embodiment, the signal shown in FIG. 4b is demodulated with reference signal 260 serving as a local oscillator in the demodulation of the signal output from the device under test. Utilizing reference signal 260 as a local oscillator in a synchronous demodulation scheme provides improved noise and linearity performance compared to other demodulation techniques. The sum of the powers of the first and second output of the Mach-Zehnder interferometer are equal to the power of the signal input to the interferometer. The signal at the output of the second output of the interferometer is thus a constant 180 degrees out of phase with the signal output from the first output arm applied to the device under test 230. Demodulation is achieved by multiplying the detected signal with the reference signal 260. Reference signal 260 is detected by photodetector 255 and the unmodulated component is blocked by high pass capacitor 257. Reference signal 260 is then provided to AM detector 290, and multiplication with the signal from the DUT produces a negative signal 270 with sum- and difference-frequency components. The resulting difference-frequency component contains the desired baseband signal which is proportional to the optical power transmitted through the device at the lasing wavelength. The sum-frequency component of negative signal 270 is twice the modulation frequency of the amplitude modulated signal 240. Referring to FIG. 4*c*, the electrical signal after multiplication indicating twice the modulated frequency (half the period) is shown. The sum frequencies of negative signal 270 are filtered out with a low pass filter 280, resulting in the waveform shown in FIG. 4*d*. The voltage signal in 4*d* varying with wavelength and time is proportional to the transmission coefficient of the device under test at each wavelength.

The multiplication and low pass filtering performed by the AM detector 290 can be performed either electronically using analog electronics or digital signal processing techniques known to those of ordinary skill in the art, or with software once the modulated waveforms have been read into a computer. As an alternative to use of reference signal 260, the detected signal from the device under test may be squared or rectified as opposed to multiplied by reference signal 260. This alternative is used in embodiments where the laser light output is input to a device under test prior to an interferometer. In the alternative embodiment in which a wavelength dither is used to generate an amplitude modulated signal, the dither signal can be used as reference signal 260.

In addition to swept wavelength measurements, in an alternative embodiment measurements at a fixed wavelength can be made to measure the transmission and reflection properties of an optical device at a fixed wavelength. When measurements at only a single wavelength are desired, the lasing wavelength of tunable laser 210 is held constant during the measurement time. The lasing wavelength is locked to the transmission characteristic of the Mach-Zehnder interferometer to prevent drift of the lasing wavelength from changing the modulation at the interferometer output. Additional system complexity is required to lock the lasing wavelength. Such an embodiment may be desirable in circumstances in which the transmission and reflection properties of an optical device are needed only at one or a select number of fixed wavelengths rather than a need to characterize the entire wavelength dependence of the optical device. In this embodiment, tunable laser 210 is tuned to a wavelength and then a measurement is made. This process is repeated for each desired wavelength.

At each wavelength at which a measurement is made, amplitude modulation of the light emitted from the laser is achieved by placing a phase modulator in one or both arms of the interferometer. A phase modulator can dynamically vary the phase of a light beam propagated through it by changing the optical path length of an arm as a function of time, resulting in an amplitude modulated signal when the signals in the two arms interferometrically combine. Phase modulators of any construction can be used. In one embodiment, phase modulators are placed in both arms of the interferometer and are driven with modulating voltages of opposite polarity, thus increasing the effective phase modulation by using a push-pull configuration in driving the interferometer. Each phase modulator controls the optical path length of the arm it is in by changing the index of refraction of the waveguide by the application of an electric field. The change in the index of refraction is proportional to the applied electric field E, the applied electric field amplitude. Positive and negative E-fields change the index of refraction in opposite directions. The phase of the signal in one arm is advanced while the phase in the other arm is retarded. The net phase difference is twice that produced in either arm, and an amplitude modulated signal is produced at the output of the interferometer when the signals in the two arms combine at the second coupler. In this embodiment, a modulator drive signal may be used as reference signal 260 in the amplitude modulation detection scheme described above.

Experimental Results

The apparatus and method of the present invention was utilized to characterize the wavelength dependence of a Bragg grating with a known insertion loss of about −60 dB in the stopband. The laser swept wavelength mode of the invention was utilized.

Figure 7:
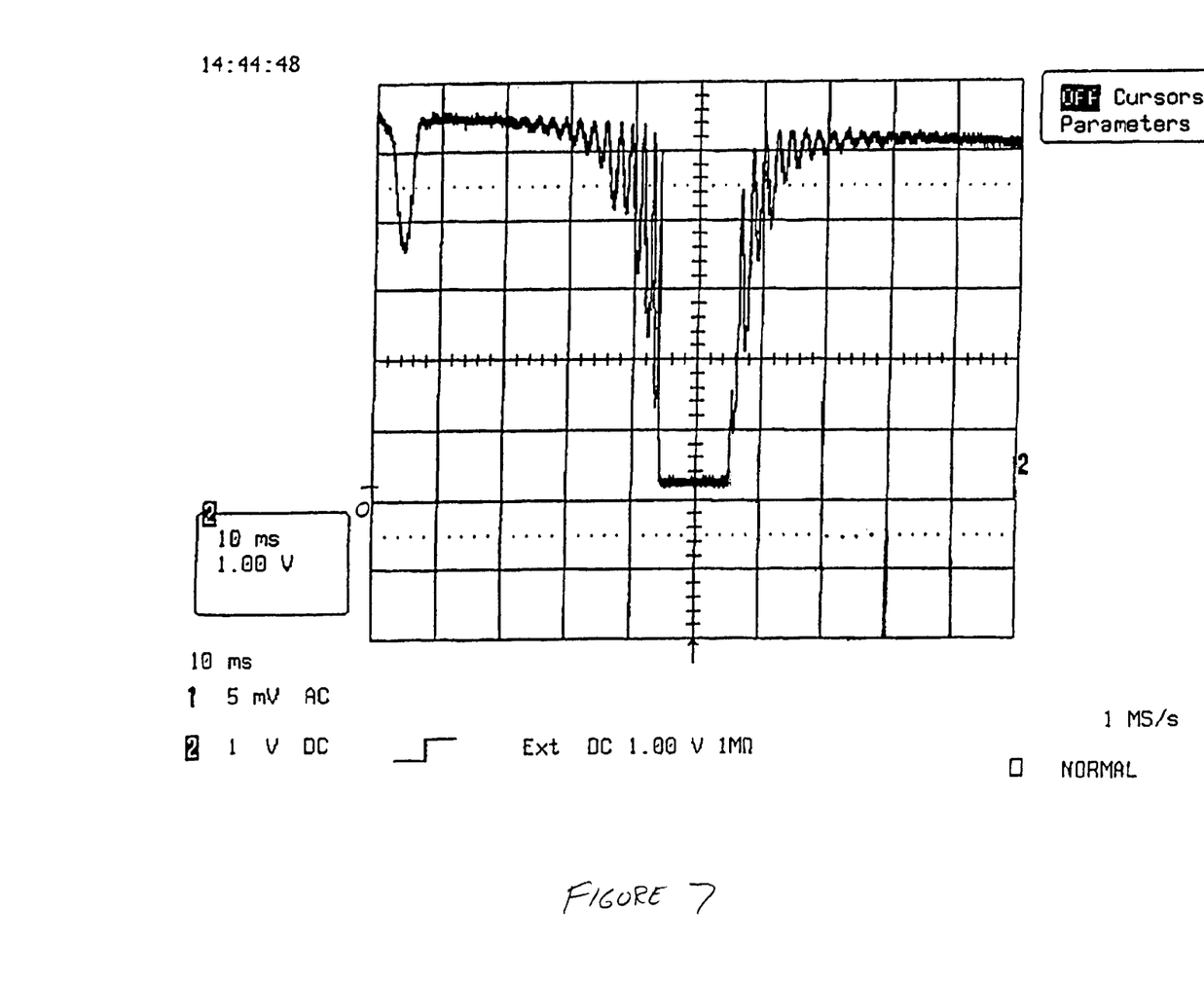
FIG. 7 illustrates the experimental results using a prior art method to determine the insertion loss of a fiber grating.

Prior to using the apparatus and method of the present invention, conventional measurement techniques were used to measure the insertion loss of the Bragg grating. Referring to FIG. 7, conventional techniques not minimizing the effects of amplified spontaneous emission measured the insertion loss of the Bragg grating to be only −25 dB. In this conventional technique, the laser output is input directly, without an intervening interferometer, to the DUT. The output of the DUT is then input directly, without an intervening interferometer, to a photodetector. The current produced by the photodetector is assumed to be proportional to insertion loss at levels where the ASE component is insignificant, limiting the insertion loss measurement to about −25 dB.

In using the apparatus and method of the current invention, a New Focus model 6428 tunable laser source was used, with a modulation frequency of the output signal from the Mach-Zehnder interferometer of 150 KHz and a wavelength sweep rate of 100 nanometers per second. The modulation frequency is proportional to the path length difference and the lasing frequency sweep rate. A frequency sweep rate of 12.5 THz per second multiplied by a path length difference time of 12 nanoseconds produces a modulation frequency of 150 KHz. The path length difference was approximately 2.5 meters of fiber. A Mach-Zehnder interferometer was constructed from non-PM fiber and splitters. In order to ensure the combined signals had the same polarization state, one of the arms contained polarization control components which mechanically stressed the fiber in a controlled fashion. Angle polished connectors were utilized to prevent optical reflections from adversely affecting measurements.

Figure 8:
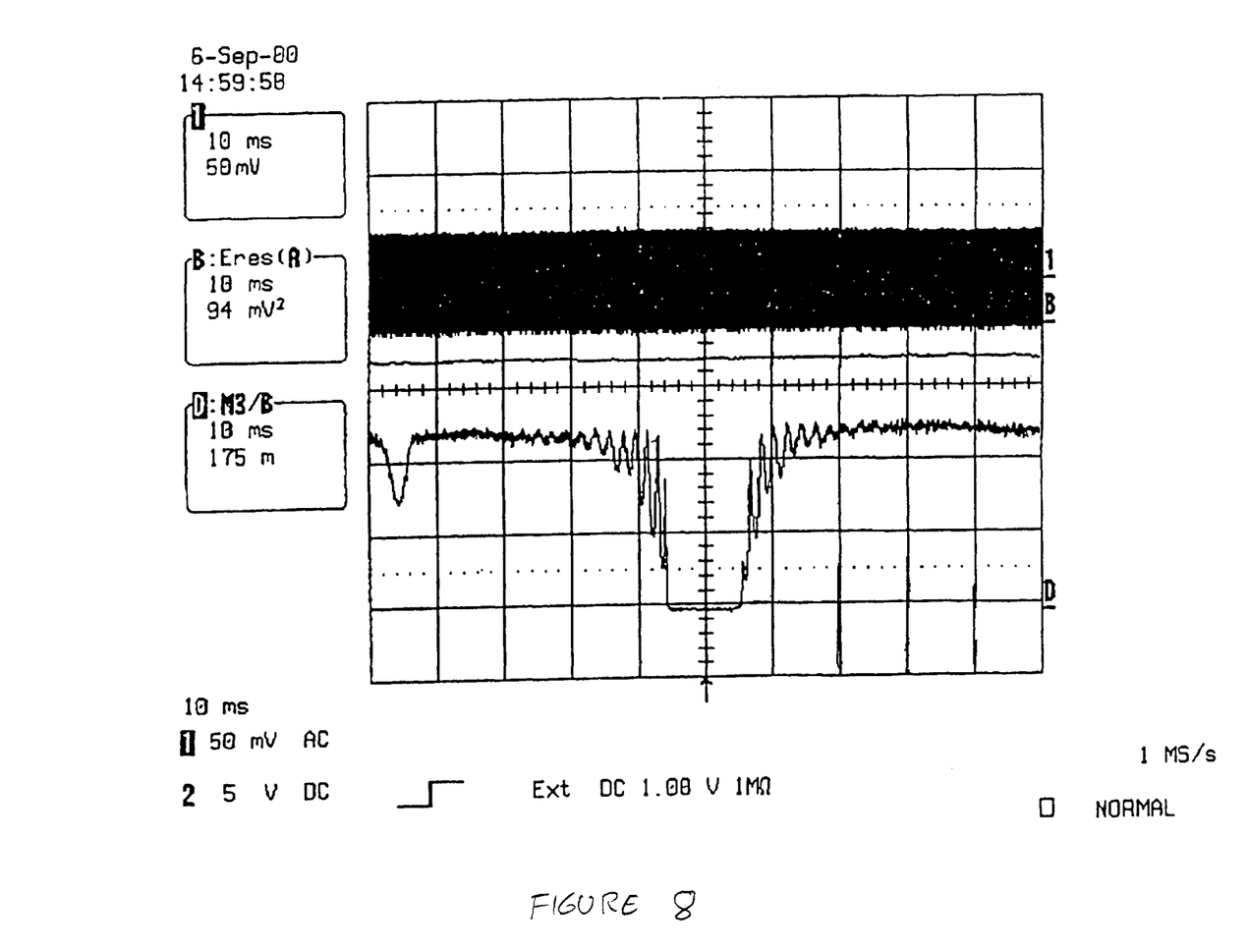
FIG. 8 illustrates the experimental results using the present invention to determine the insertion loss of a fiber grating.
Figure 9:
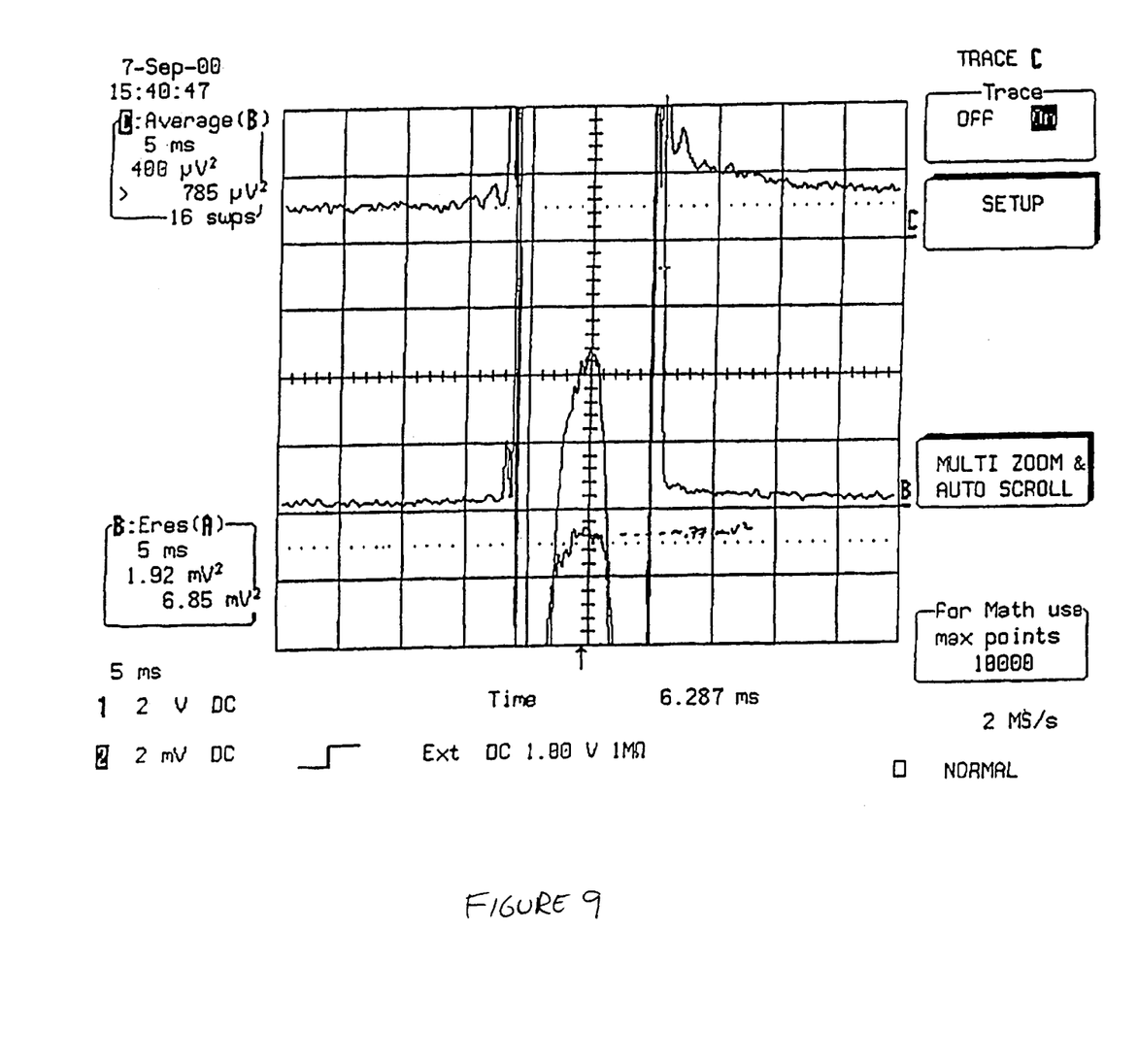
FIG. 9 shows the experimental results of FIG. 8 with the scale of the vertical axis enlarged.
Figure 10:
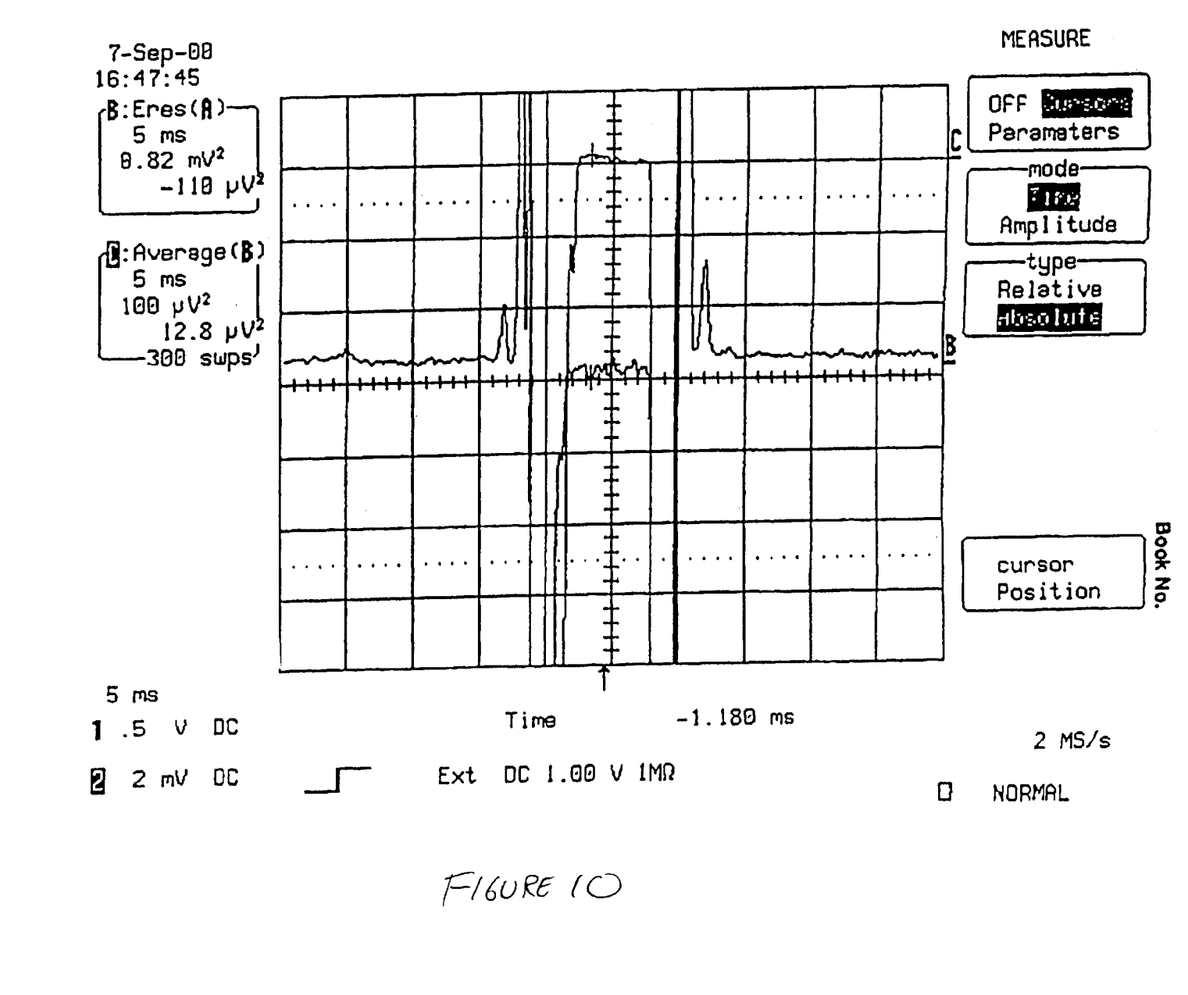
FIG. 10 shows the experimental results using the present invention to determine the insertion loss of two cascaded fiber gratings.

A New Focus model 2011 photoreceiver was used to detect the amplitude modulated signal output from the Bragg grating and the reference signal. The model 2011 photoreceiver comprises photodetectors with associated electronics such as amplifiers and high pass filters to block the ASE DC bias level component of the signal received from the Bragg grating. A Lecroy oscilloscope was used to multiply the signal output from the Bragg grating with the reference signal and low pass filter the signal. Low pass filtering was performed using the vertical resolution enhancement feature of the oscilloscope. Using the apparatus and method of the present invention to minimize the effects of amplified spontaneous emission measured the insertion loss of the Bragg grating to be −61 dB, indicating the effects of ASE at this level of insertion loss were negligible using the invention. Referring to FIG. 8, the characterization of the wavelength dependence of the fiber grating used to determine the insertion loss of −61 dB is set forth. Referring to FIG. 9, the vertical axis shown in FIG. 8 has been increased from 94 millivolts squared to 400 microvolts squared per division. Referring to FIG. 10, cascading of two fiber gratings resulted in the measurement of a synchronous noise level of −73 dB.

Having described the invention in terms of a preferred embodiment, it will be recognized by those skilled in the art that various types of general purpose optical hardware may be substituted for the configuration described above to achieve an equivalent result. It will be apparent to those skilled in the art that modifications and variations of the preferred embodiment are possible, such as different lasers may be used, different interferometers, as well as different types of amplitude modulation detection techniques may be used to perform equivalent functions, all of which fall within the true spirit and scope of the invention as measured by the following claims.

I claim:

1. A method for minimizing the effects of noise when measuring a response of a device under test to laser light comprising:
    imparting time-varying interference modulations to a laser light to produce a time-varying interference modulated test laser light and a time-varying interference modulated reference laser light;
    propagating the time-varying interference modulated test laser light to the device under test so as to cause the device under test to propagate responsive time-varying interference modulated test laser light;
    converting the responsive time-varying interference modulated test laser light to a responsive amplitude modulated electrical test signal;
    high pass filtering the responsive amplitude modulated electrical test signal; and
    processing the high pass filtered amplitude modulated electrical test signal so as to produce a time-varying electrical signal that represents the responsive time-varying interference modulated test laser light propagated by the device under test in response to the time varying interference modulated test laser light.

2. The method of claim 1, wherein processing the high pass filtered amplitude modulated electrical test signal comprises:
    converting the time-varying interference modulated reference laser light to an amplitude modulated electrical reference signal;
    high pass filtering the amplitude modulated electrical reference signal;
    mixing the high pass filtered amplitude modulated electrical test signal with the high pass filtered amplitude modulated electrical reference signal to produce one or more mixing result signals; and
    low pass filtering the one or more mixing result signals.

3. The method of claim 1, wherein processing the high pass filtered amplitude modulated electrical test signal comprises:
    squaring the high pass filtered amplitude modulated electrical test signal so as to produce one or more result signals; and
    low pass filtering the one or more result signals.

4. The method of claim 1, further comprising:
    providing an optical amplifier; and
    amplifying the source laser light with the optical amplifier.

5. The method of claim 1, wherein the time-varying interference modulations imparted to the test laser light and to the reference laser light are at a modulation frequency equal to the product of the frequency sweep rate and the delay in propagation time.

6. A method for minimizing the effects of noise when measuring a response of a device under test to laser light comprising:
    scanning a source laser light through a range of lasing light wavelengths so as to produce source laser light with a time-varying lasing light wavelength;
    providing an interferometer with a first path with a first optical path length and a second path with a second optical path length, wherein there is a path length difference between the first optical path length and the second optical path length;
    splitting the source laser light into a first laser light portion and a second laser light portion, wherein the first laser light portion propagates through the first path and the second laser light portion propagates through the second path and there is a delay in propagation time between the first laser light portion and the second laser light portion due to the path length difference;
    combining the first laser light portion with the second laser light portion to produce a time-varying interference modulated test laser light and a time-varying interference modulated reference laser light;
    propagating the time-varying interference modulated test laser light to the device under test so as to cause the device under test to propagate responsive time-varying interference modulated test laser light;
    converting the responsive time-varying interference modulated test laser light to a responsive amplitude modulated electrical test signal;
    high pass filtering the responsive amplitude modulated electrical test signal; and
    processing the high pass filtered amplitude modulated electrical test signal so as to produce a time-varying electrical signal that represents the responsive time-varying interference modulated test laser light propagated by the device under test in response to the time varying interference modulated test laser light.

7. The method of claim 6, wherein processing the high pass filtered amplitude modulated electrical test signal comprises:
    converting the time-varying interference modulated reference laser light to an amplitude modulated electrical reference signal;
    high pass filtering the amplitude modulated electrical reference signal;
    mixing the high pass filtered amplitude modulated electrical test signal with the high pass filtered amplitude modulated electrical reference signal to produce one or more mixing result signals; and
    low pass filtering the one or more mixing result signals.

8. The method of claim 6, wherein processing the high pass filtered amplitude modulated electrical test signal comprises:
    squaring the high pass filtered amplitude modulated electrical test signal so as to produce one or more result signals; and
    low pass filtering the one or more result signals.

9. The method of claim 6, further comprising:

providing an optical amplifier; and amplifying the source laser light with the optical amplifier.

10. The method of claim 6, wherein the time-varying interference modulations imparted to the test laser light and to the reference laser light are at a modulation frequency equal to the product of the frequency sweep rate and the delay in propagation time.

11. A method for minimizing the effects of noise when measuring a response of a device under test to laser light comprising:

splitting a source laser light into a first light portion and a second laser light portion with a time-varying interferometer, whereby the first laser light portion and second laser light portion travel different optical path lengths;

combining the first laser light portion with the second laser light portion to produce a time-varying interference modulated test laser light and a time-varying interference modulated reference laser light;

propagating the time-varying interference modulated test laser light to the device under test to produce a responsive time-varying interference modulated test laser light;

converting the responsive time-varying interference modulated test laser light to a responsive amplitude modulated electrical test signal;

high pass filtering the responsive amplitude modulated electrical test signal; and processing the high pass filtered amplitude modulated electrical test signal to produce a time-varying electrical signal representing the responsive time-varying interference modulated test laser light propagated by the device under test in response to the time varying interference modulated test laser light.

12. The method of claim 11, wherein processing the high pass filtered amplitude modulated electrical test signal comprises:

converting the time-varying interference modulated reference laser light to an electrical signal whereby the time-varying interference modulated reference laser light is converted to an amplitude modulated electrical reference signal;

high pass filtering the amplitude modulated electrical reference signal so as to produce a high pass filtered amplitude modulated electrical reference signal;

mixing the high pass filtered amplitude modulated electrical test signal with the high pass filtered amplitude modulated electrical reference signal so as to produce one or more mixing result signals; and low pass filtering the one or more mixing result signals.

13. The method of claim 11, wherein processing the high pass filtered amplitude modulated electrical test signal comprises:

squaring the high pass filtered amplitude modulated electrical test signal so as to produce one or more result signals; and low pass filtering the one or more result signals.

14. The method of claim 11, further comprising:

providing an optical amplifier; and amplifying the source laser light with the optical amplifier.

15. The method of claim 11, wherein the time-varying interferometer is a Mach-Zehnder interferometer utilizing a phase modulator in a first and/or second path of the Mach-Zehnder interferometer.

16. A method for minimizing the effects of noise when measuring a response of a device under test to laser light comprising:

providing source laser light at a lasing wavelength from a laser light source;

modulating the phase or lasing wavelength so as to produce source laser light with a time-varying lasing light wavelength;

imparting time-varying interference modulations to the source laser light to produce a time-varying interference modulated test laser light and a time-varying interference modulated reference laser light;

propagating the time-varying interference modulated test laser light to the device under test so as to cause the device under test to propagate responsive time-varying interference modulated test laser light;

converting the responsive time-varying interference modulated test laser light to a responsive amplitude modulated electrical test signal;

high pass filtering the responsive amplitude modulated electrical test signal; and processing the high pass filtered amplitude modulated electrical test signal so as to produce a time-varying electrical signal that represents the responsive time-varying interference modulated test laser light propagated by the device under test in response to the time varying interference modulated test laser light.

17. The method of claim 16, wherein processing the high pass filtered amplitude modulated electrical test signal comprises:

converting the time-varying interference modulated reference laser light to an amplitude modulated electrical reference signal;

high pass filtering the amplitude modulated electrical reference signal;

mixing the high pass filtered amplitude modulated electrical test signal with the high pass filtered amplitude modulated electrical reference signal to produce one or more mixing result signals; and low pass filtering the one or more mixing result signals.

18. The method of claim 16, wherein processing the high pass filtered amplitude modulated electrical test signal comprises:

squaring the high pass filtered amplitude modulated electrical test signal so as to produce one or more result signals; and low pass filtering the one or more result signals.

19. The method of claim 16, further comprising:

providing an optical amplifier; and amplifying the source laser light with the optical amplifier.

20. A method for removing the effects of amplified spontaneous emission upon the response of a device under test to a lasing light comprising:

propagating a high frequency time-varying lasing light to the device under test to cause the device under test to propagate responsive high frequency time-varying lasing light;

converting the responsive high frequency time-varying lasing light to a responsive amplitude modulated electrical test signal; and high pass filtering the responsive amplitude modulated electrical test signal.

21. The method of claim 20, wherein the high frequency time-varying lasing light is propagated from an interferometric device which receives as its input source laser light from a laser light source.

22. The method of claim 20 further comprising:

processing the high pass filtered amplitude modulated electrical test signal to produce a time-varying electrical signal indicative of the responsive high frequency time-varying lasing light propagated by the device under test in response to the high frequency time-varying lasing light.

23. A system for minimizing the effects of noise when measuring a response of a device under test to laser light comprising:

an interferometer for splitting a source laser light with a time-varying lasing light wavelength into a first laser light portion and a second laser light portion and combining the first laser light portion with the second laser light portion to produce a time-varying interference modulated test laser light and a time-varying interference modulated reference laser light;

a device under test for receiving the test laser light, the device under test propagating a responsive time-varying interference modulated test laser light;

a photodetector for converting the responsive time-varying interference modulated test laser light to a responsive amplitude modulated electrical test signal;

a high pass filter for filtering the responsive amplitude modulated electrical test signal; and an modulation amplitude detector for processing the high pass filtered amplitude modulated electrical test signal so as to produce a time-varying electrical signal that represents the responsive time-varying interference modulated test laser light propagated by the device under test in response to the time varying interference modulated test laser light.

24. The system of claim 23, further comprising an optical amplifier for amplifying the source laser light.

25. The system of claim 23, wherein the interferometer is a Mach-Zehnder interferometer.

26. A system for minimizing the effects of noise when measuring a response of a device under test to laser light comprising:

a time-varying interferometer for splitting a source laser light with a fixed lasing light wavelength into a first laser light portion and a second laser light portion and combining the first laser light portion with the second laser light portion to produce a time-varying interference modulated test laser light and a time-varying interference modulated reference laser light;

a device under test for receiving the test laser light, the device under test propagating a responsive time-varying interference modulated test laser light;

a photodetector for converting the responsive time-varying interference modulated test laser light to a responsive amplitude modulated electrical test signal;

a high pass filter for filtering the responsive amplitude modulated electrical test signal; and an modulation amplitude detector for processing the high pass filtered amplitude modulated electrical test signal so as to produce a time-varying electrical signal that represents the responsive time-varying interference modulated test laser light propagated by the device under test in response to the time varying interference modulated test laser light.

27. The system of claim 26, further comprising an optical amplifier for amplifying the source laser light.

28. The system of claim 26 wherein the time-varying interferometer is a Mach Zehnder interferometer utilizing a phase modulator in a first and/or second path of the Mach-Zehnder interferometer.

29. A system for minimizing the effects of noise when measuring a response of a device under test to laser light comprising:

a means for splitting a source laser light with a fixed lasing light wavelength into a first laser light portion and a second laser light portion and producing a time-varying interference modulated test laser light and time-varying interference modulated reference laser light;

a device under test for receiving the test laser light, the device under test propagating a responsive time-varying interference modulated test laser light;

a means for converting the responsive time-varying interference modulated test laser light to a responsive amplitude modulated electrical test signal;

a means for filtering the responsive amplitude modulated electrical test signal; and a means for processing the high pass filtered amplitude modulated electrical test signal so as to produce a time-varying electrical signal that represents the responsive time-varying interference modulated test laser light propagated by the device under test in response to the time varying interference modulated test laser light.

30. The system of claim 29, further comprising a means for amplifying the source laser light.

31. A system for minimizing the effects of noise when measuring a response of a device under test to laser light comprising:

a means for splitting a source laser light with a time-varying lasing light wavelength into a first laser light portion and a second laser light portion and producing a time-varying interference modulated test laser light and time-varying interference modulated reference laser light;

a device under test for receiving the test laser light, the device under test propagating a responsive time-varying interference modulated test laser light;

a means for converting the responsive time-varying interference modulated test laser light to a responsive amplitude modulated electrical test signal;

a means for filtering the responsive amplitude modulated electrical test signal; and a means for processing the high pass filtered amplitude modulated electrical test signal so as to produce a time-varying electrical signal that represents the responsive time-varying interference modulated test laser light propagated by the device under test in response to the time varying interference modulated test laser light.

32. The system of claim 31, further comprising a means for amplifying the source laser light.

* * * * *